Figure 1:
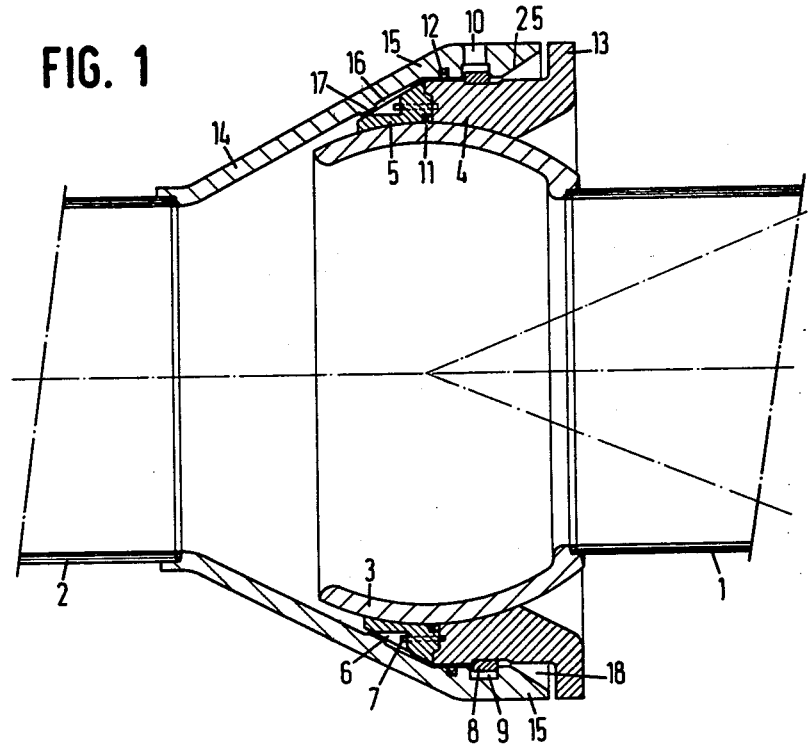

United States Patent [19]

Amelink

[11] 4,298,219

[45] Nov. 3, 1981

[54] QUICK-COUPLING BALL-AND-SOCKET JOINT

[75] Inventor: Joost Amelink, Spaarndam, Netherlands

[73] Assignee: Scheepswerf Stapel B.V., Spaarndam, Netherlands

[21] Appl. No.: 39,434

[22] Filed: May 15, 1979

[30] Foreign Application Priority Data

May 18, 1978 [NL] Netherlands ................... 7805407

[51] Int. Cl.³ .................................... F16L 35/00
[52] U.S. Cl. ................................ 285/24; 285/39; 285/261; 285/321
[58] Field of Search ................ 285/321, 261, 24, 27, 285/271, 39

[56] References Cited

U.S. PATENT DOCUMENTS

| | | | |
|---|---|---|---|
| 3,429,588 | 2/1969 | Nelson | 285/261 X |
| 3,433,504 | 3/1969 | Hanes | 285/321 X |
| 3,450,421 | 6/1969 | Harwell | 285/321 X |
| 3,521,911 | 7/1970 | Hanes et al. | 285/321 X |
| 3,741,591 | 6/1973 | Fessler | 285/321 X |
| 3,944,263 | 3/1976 | Arnold | 285/261 X |
| 4,139,221 | 2/1979 | Shotbolt | 285/261 |

FOREIGN PATENT DOCUMENTS

| | | |
|---|---|---|
| 7610944 | 2/1979 | Netherlands . |
| 570561 | 7/1945 | United Kingdom ............ 285/321 |
| 1041499 | 9/1966 | United Kingdom . |
| 1141782 | 1/1969 | United Kingdom . |
| 1525797 | 9/1978 | United Kingdom . |

Primary Examiner—Dave W. Arola
Attorney, Agent, or Firm—Cushman, Darby & Cushman

[57] ABSTRACT

A quick-coupling ball-and-socket joint for two rigid pipe lengths 1, 2, for instance of a dredging sludge pipe line, provided with a ball joint 3 affixed to the one pipe length 1, and with a ball socket 4, 5, 14 affixed in the coupled position integrally to the other pipe length 2, in which socket the ball joint 3 in the coupled position is omnilaterally pivotable, and which ball socket 4, 5, 14 comprises at least a two-part coupling body 4, 5 which is integrally omnilaterally pivotable with respect to the ball joint 3, and retained about said ball joint 3, and a separate sleeve 14 affixed to the other pipe length 2, said coupling body 4, 5 and sleeve 14 being adapted during the insertion for coupling the pipe lengths 1, 2 in the sleeve 14 of the ball joint 3 with coupling body 4, 5 retained therearound, for snapping together said sleeve 14 and said coupling body 4, 5 with mutual centering.

1 Claim, 2 Drawing Figures

QUICK-COUPLING BALL-AND-SOCKET JOINT

The invention relates to a ball-and-socket joint for the coupling of rigid portions of pipe lines, in particular those which are used for pumping dredging mud at sea. Normally such a pipe line comprises rigid pipe sections that are pivotally coupled, each being carried by floating bodies.

The advantages of the invention especially are apparent when heavy pipe sections of large diameter have to be interconnected under difficult circumstances.

The hitherto known ball-and-socket constructions for dredging lines substantially consist of the following components:
 a ball socket
 a ball joint which is adapted for rotation in all directions in the ball socket
 a thrust washer for fixing the ball joint in the ball socket.

The attachment of the thrust washer to the ball socket is performed in different manners:
 with bolt connections, often designed as hinged bolt connection for rapid assembly and disassembly
 with a bayonet fitting.

Coupling of the ball joint takes place by inserting a pipe section with welded or flanged ball joint, with loose thrust washer in a pipe section with welded or flanged ball socket. The operations therefor should often be carried out on open water with undulations. As a result, during the insertion of the joint in the socket, damage of the accurately machined joint surfaces may occur. When the joint has been positioned in the socket, the relatively heavy thrust washer is to be positioned and be connected to the ball socket by means of the hinged bolts or by rotation (bayonet). Especially with large ball diameters (bore 800 mm and larger) this is an inconvenient operation in practice. In order to prevent the drawback of the positioning of the thrust washer (bayonet ring) constructions are known which retain the thrust washer on the joint by means of a so-called retaining ring. However this does not prevent the drawbacks of damage of the ball construction and the heavy labour to be carried out often under difficult and even dangerous conditions for effecting the connection thrust washer/ball socket.

Primarily it is the object of the present invention to provide such an embodiment of the ball-and-socket joint that during the coupling the danger of damage to the ball joint is minimized, but mainly that the coupling can be effected quickly and easily in such a way that it is not necessary during coupling to carry out operations on the ball-and-socket joint itself.

The invention provides a quick-coupling ball-and-socket-joint for flexible coupling of two rigid pipe lengths of a pipe line, in particular for pumping dredging sludge, comprising a ball joint secured to a first pipe length and a ball socket which, after the coupling, is entirely secured to a second pipe length, and in which ball socket the ball joint is omnilaterally pivotal, characterized in that the ball socket comprises two separate parts, viz. one pivotal part that is omnilaterally pivotal as a whole about the ball joint and enclosed—the "coupling body"—and a non-pivotal portion having the shape of a sleeve, secured to the second pipe length, whereby the coupling body and the sleeve are so designed that during insertion of the coupling body in the sleeve, in that the two pipe sections are moved towards each other, the coupling member is self-centered in the sleeve and eventually sealingly secured. It will be clear that the concept "ball" need not be taken literally in the geometrical sense.

In other words the invention provides a quick-coupling ball-and-socket joint for flexibly coupling two rigid pipe lengths of a pipe line, in particular for pumping dredging sludge, consisting of:
(a) a ball joint comprising an axially bilaterally open body of rotation of a circular segment secured on a first pipe length, one of the openings of the body of revolution being in axial-symmetrical connection with the opening of said first pipe length,
(b) a coupling body which by means of a socket-shaped face is integrally disposed in fitting relationship and omnilaterally pivotally retained on the body of rotation mentioned under a;
(c) a sleeve, axially-symmetrically secured to the end of the second pipe length, where-by the body of revolution mentioned under b and the sleeve mentioned under c are of such construction (adapted to each other), that during insertion of the coupling body in the sleeve through the movement of the two pipe lengths towards each other, the coupling body will be self-centred in the sleeve and finally be secured sealingly.

When there is question of "sealing" securing, this will not mean an absolute sealing. It will be clear that leaks permitting a part of the water from emerging from the dredging sludge, will not form an impediment, provided the dredging sludge remains properly pumpable.

It will be clear, and moreover it will be further elucidated in the following description of an embodiment depicted in the drawing, that in a construction of the above described type damage of the pivoting surfaces of respectively the ball joint and ball socket can be substantially entirely avoided.

The attachment of the coupling body to the sleeve is achieved according to an embodiment of the invention by using a circlip ("Seeger ring"), which is disposed in a circular slot of one of said parts, and is impressed during the coupling via a conical portion of the other part and snaps into a groove in said other part. According to a preferred embodiment the Seeger ring is disposed in the coupling body and the groove in the sleeve. The Seeger ring is compressed by a conical portion in the front part of the inner wall of the sleeve and during the coupling when the coupling body is inserted in the sleeve, is gradually inserted by said coupling portion and expands in the groove of the sleeve. The Seeger ring—seen in thickness—will then be partly present in the coupling body and for the rest in the sleeve, so that these parts are locked in each other.

In a practical embodiment according to the following example to be described, the sleeve at the inner side has a portion whose main shape is conical. The edge of the smallest opening of the cone coincides with and is affixed to the edge of the second pipe length. Seen in axial direction at the outer side the conical inner wall passes into a substantially cylindrical inner wall. The coupling body has a shape adapted to said sleeve construction and comprises a portion having a conical outer circumference, corresponding in the coupled position to the conical inner wall of the sleeve and an adjoining portion having a substantially cylindrical outer wall, corresponding in coupled position to the cylindrical inner wall of the sleeve. The Seeger ring for locking the coupling body to the sleeve may thereby be disposed in a slot in the cylindrical part of the sleeve, and during the coupling, through interaction with the conical portion of the coupling body, may be entirely pressed back in said slot and snap back in the groove in the cylindrical portion of the coupling body.

For unlocking sleeve and coupling body, the diameter of the Seeger ring should again be enlarged so that the ring emerges entirely from the groove of the coupling body, retracting itself into the slot in the cylindrical portion of the sleeve. To this effect a recess may be disposed in the Seeger ring; by a corresponding recess in the cylindrical portion of the sleeve, means may be inserted which, engaging in the recess of the Seeger ring, increase said recess and thereby the diameter of the Seeger ring. A manually operable lever or a hydraulic construction is possible. This will be further elucidated on the basis of the described embodiment, as shown in the drawing.

The invention also provides a method of coupling two rigid pipe lengths of a pipe line for pumping dredging sludge, by means of a ball-and-socket joint, as described in the above, which pipe lengths are each carried by a floating body, characterized in that the floating bodies are moved towards each other, in such a way that the ball joint with coupling body, affixed to one of the pipe lengths, is urged into the sleeve affixed to the other pipe length and is secured therein.

Figure 2:
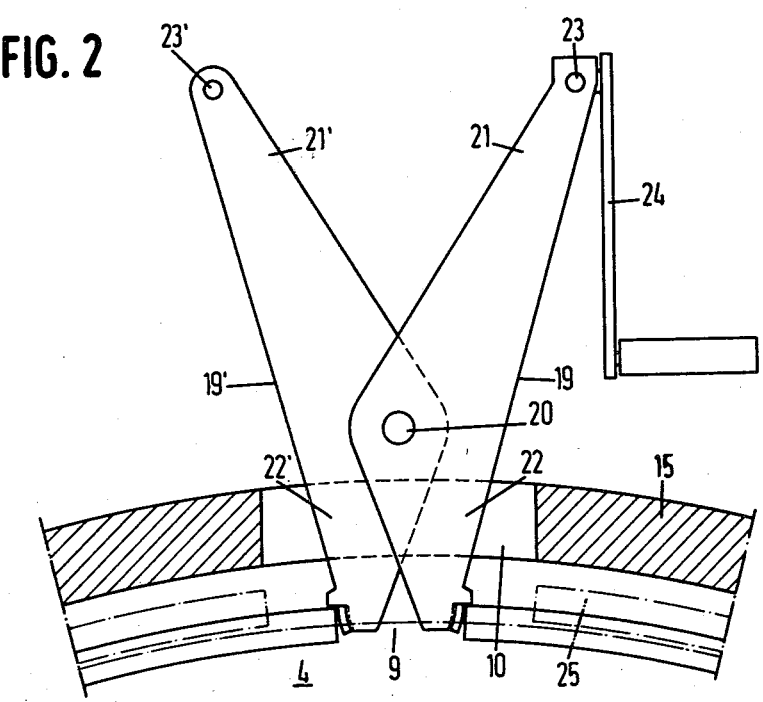

FIG. 1 is a cross section of a preferred embodiment of a ball-and-socket joint in the position in which the two coupled pipe lengths are co-extensive with their axes;

FIG. 2 diagrammatically shows a construction for the unlocking of sleeve and coupling body by means of the Seeger ring.

In FIG. 1 a first rigid pipe length is indicated by 1 which is to be omnilaterally and pivotally connected to the second rigid pipe length 2. On the pipe length 1 is welded the segment 3 of a hollow ball. Around the segment 3 there is retained a coupling body comprising two parts 4 and 5. In the recess 6 in 5 can be shown the head of a bolt 7 to which the parts 4 and 5 of the coupling body are interconnected. In a groove in 4 is fitting the Seeger ring 8 which pertains in the slot 9 of the hereunder discussed sleeve wherein the coupling body is secured, in which slot there is also disposed a layer of foam rubber. By 10 is indicated a recess in the cylindrical portion 15 of the sleeve, in which recess the Seeger ring is accommodated and wherein the means for unlocking have to be applied. By 11 is indicated a sealing ring (e.g. of neoprene) in the coupling body 4, 5 and by 12 a similar sealing ring in the cylindrical portion 15 of the sleeve.

The cylindrical portion 15 of the sleeve passes into the conical portion 14 thereof, which portion is welded onto the second pipe length 2. The coupling between the sleeve and the coupling body naturally takes place optimally if during the approach of said two portions, the axes of the sleeve and the coupling body coincide. To render this coinciding action gradual, the coupling body is provided with a collar 13 which is adapted to coact with the edge of the cylindrical portion of the sleeve. Likewise the inclined side 16 of the coupling member coacts in centring relationship with the beveled side 25 of the edge of the sleeve.

In case the Seeger ring is not disposed in the cylindrical portion 15 of the sleeve but in the portion 4 of the coupling body, there may be disposed a conical recess 18 in the edge of 15.

In FIG. 2 is indicated a view of an apparatus by means of which uncoupling can be simply effected between the two coacting parts of the ball-and-socket joint described with reference to FIG. 1. This apparatus basically comprises pincers, with reverse effect, consisting of two halves 19 and 19', pivotal about a shaft 20. Each half has a "long" leg 21 and 21' and a "short" leg 22 and 22'. The long legs 21 and 21' are adapted for movement towards and away from each other by internally threaded nuts 23 and 23' which coact with threaded rods (not shown) by turning the handle 24. When the long legs 21 and 21' move towards each other, the short legs 22 and 22' will move away from each other and vice versa. The Seeger ring 8 rests in the slot 9 of the portion 4 of the ball socket and likewise in the slot 10 in the portion 15 of the sleeve. When the short legs 22 and 22' move away from each other, the circumference of the Seeger ring will be increased. This will eventually occupy the dotted position, indicated by 25 and thereby be pressed entirely from the slot 9 of the portion 4 of the ball socket, after which uncoupling may take place.

I claim:

1. A quick-coupling ball-and-socket joint for coupling two rigid pipe lengths comprising: a hollow ball secured to the end of a first pipe length, said ball having a flow passage therethrough communicating at one end with the interior of the first pipe length; an annular coupling body closing around and connecting with the ball, the annular coupling body having an interior surface complementary to and engaging the surface of the ball so as to be omnilaterally pivotable relative thereto, the end portion of said body facing away from the first pipe length having a conical outer surface and the outer surface of said body axially adjacent the conical surface being cylindrical; the end portion of said body facing toward said first pipe length having a circumferential collar which projects radially outwardly; a sleeve coaxial with and secured to a second pipe length, the diameter of said collar being not less than the diameter of said sleeve and said sleeve having an interior conical surface and an axially adjacent cylindrical surface which are complementary to the conical surface and cylindrical surface on said coupling body, and said sleeve having an open end portion which terminates in an edge facing toward said first pipe length and which has an inner beveled surface so that when the ball and coupling body is being inserted into the sleeve at an angle thereto said collar engages and coacts with said edge at a first location thereon and said beveled surface engages and coacts with said conical surface on said coupling body to aid in bringing the coupling body into centering relationship with the sleeve; and means for releasably locking the sleeve to the coupling body, said means including an annular circumferential groove in the outer cylindrical surface of the coupling body and an annular circumferential groove in the interior cylindrical surface of the sleeve, said grooves being so disposed that they come to lie opposite each other in the coupling position of the joint, and a circlip in one of the grooves projecting radially from said one groove in a manner such that the circlip is pressed into said one groove and then expands partially into the other groove while remaining partially in said one groove as said grooves come to lie opposite each other during insertion of the coupling body into the sleeve, the outer surface of the sleeve having a recess therein communicating with the respective groove to provide access for a releasing tool to engage the circlip.

* * * * *